(12) United States Patent
Kelley et al.

(10) Patent No.: US 7,845,005 B2
(45) Date of Patent: Nov. 30, 2010

(54) METHOD FOR PREVENTING MALICIOUS SOFTWARE INSTALLATION ON AN INTERNET-CONNECTED COMPUTER

(75) Inventors: Edward E. Kelley, Wappingers Falls, NY (US); Franco Motika, Hopewell Junction, NY (US); Tijs I. Wilbrink, Leiden (NL)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 11/307,429

(22) Filed: Feb. 7, 2006

(65) Prior Publication Data

US 2007/0192854 A1 Aug. 16, 2007

(51) Int. Cl.
*G06F 12/14* (2006.01)
(52) U.S. Cl. .................. 726/22; 713/165; 713/193; 711/154; 726/26
(58) Field of Classification Search ............... 726/22, 726/23, 24, 25, 2, 26, 27; 713/1, 2, 188, 713/194, 164, 165; 380/200, 201, 255, 277; 711/154, 163
See application file for complete search history.

(56) References Cited

U.S. PATENT DOCUMENTS 5,359,659 A * 10/1994 Rosenthal .................. 726/24

(Continued)

FOREIGN PATENT DOCUMENTS

| DE | 10055118 A1 | 4/2001 |
| DE | 10208442 A1 | 5/2003 |
| WO | PCT/AU2004/000387 | 3/2004 |
| WO | WO 2004/086228 | 7/2004 |
| WO | WO 2005/027402 | 3/2005 |

OTHER PUBLICATIONS

Jeff Duntemann, "Inside the Virtual Machine" PCMAG.COM, [online] Aug. 31, 2005, XP002447107 Retrieved from the Internet: URL: http://www.pcmag.com/print_article2/0, 1217,a=159209,00.asp> [retrieved on Aug. 16, 2007] the whole document.
Jeff Duntemann: "Jul. 6, 2005: Virtualizing the Internet Experience" [Online] Jul. 2005, XP002447108 Retrieved from the Internet: URL:http://web.archieve.org/web/20051028001605/http://www.dntemann.com/july2005.htm#07-06-2005> [retrieved on Aug. 15, 2007] the whole doucument.

(Continued)

*Primary Examiner*—Kimyen Vu
*Assistant Examiner*—Joseph Pan
(74) *Attorney, Agent, or Firm*—Whitham, Curtis, Christofferson & Cook, P.C.; William H. Steinberg (57) ABSTRACT

A computer random access memory is divided into first and second partitions. Each partition has its own operating system (OS). The first partition has a conventional OS and is designated for non-Internet use. The second partition is designated for secure Internet access, and has an OS specific for Internet usage. Software in the second partition cannot write or copy files in the second partition. The size of the second partition is fixed and unchangeable while said second partition is open. Each software application in the second partition is allocated a memory region that cannot be changed, thereby preventing memory overflow attacks. A secure memory is designated for temporary storage of software used in the second partition. Cyclic redundancy check (CRC) values are calculated for all files in the secure memory. To detect unauthorized file changes, CRC values are calculated for all files used in the second partition, and checked against values stored in the secure memory. The second partition can write only to a secure memory using a security arrangement such as password protection or a download memory separate from the first partition to allow files stored in the download memory to be examined by scanning and testing from the first partition prior to being stored elsewhere in the computer.

18 Claims, 4 Drawing Sheets

U.S. PATENT DOCUMENTS

| | | | | |
|---|---|---|---|---|
| 5,842,002 | A * | 11/1998 | Schnurer et al. | 703/21 |
| 6,292,874 | B1 | 9/2001 | Barnett | |
| 6,751,679 | B1 | 6/2004 | Arndt et al. | |
| 7,024,555 | B2 * | 4/2006 | Kozuch et al. | 726/22 |
| 7,069,439 | B1 * | 6/2006 | Chen et al. | 713/172 |
| 7,146,640 | B2 | 12/2006 | Goodman et al. | |
| 7,424,611 | B2 * | 9/2008 | Hino et al. | 713/167 |
| 2002/0166059 | A1 * | 11/2002 | Rickey et al. | 713/200 |
| 2003/0023867 | A1 | 1/2003 | Thibadeau | |
| 2003/0101322 | A1 | 5/2003 | Gardner | |
| 2004/0088697 | A1 * | 5/2004 | Schwartz et al. | 717/174 |
| 2004/0147251 | A1 * | 7/2004 | Nakayama et al. | 455/414.2 |
| 2004/0177342 | A1 | 9/2004 | Worley, Jr. | |
| 2004/0236874 | A1 * | 11/2004 | Largman et al. | 710/8 |
| 2005/0221766 | A1 * | 10/2005 | Brizek et al. | 455/73 |

OTHER PUBLICATIONS

Greg Schultz: "Microsoft Virtual PC 2004" PC Today, [Online] vol. 3, No. 6, Jun. 2005, pp. 96-96, XP002447109 USA ISBN: 7447079746 Retrieved from the Internet: URL:http://www.computerpoweruser.com/ARticles%5CPDFMagazine%5CGood%5CPCT_0306.pdf?guid=> [retrieved on Aug. 16, 2007] the whole document.

Gann R: "Norton Gives Virus Protection A Boost" PC User, London, GB, No. 224, Dec. 14, 1993, pp. 61-62, XP000613958 the whole document.

United Kingdom International Search Report, by Pilvi Koski, Aug. 30, 2007, pp. 1-12. International application No. PCT/EP2007/050442.

Chinese Office Action.

* cited by examiner

Fig. 3a
Initialization for Secure Internet Access.

Fig. 3b
Initialization for Secure Internet Access.

Fig. 4 Secure Internet Access.

Fig. 5
Secure Download Routine

METHOD FOR PREVENTING MALICIOUS SOFTWARE INSTALLATION ON AN INTERNET-CONNECTED COMPUTER

FIELD OF THE INVENTION

The present invention relates generally to computer security and Internet security. More specifically, the present invention relates to a method for preventing malicious software from being installed on a computer system. The present invention provides a dedicated partition for Internet use within which malicious software cannot be installed.

BACKGROUND OF THE INVENTION

Malicious software distributed on the Internet is a large and growing problem. Criminals and hackers have developed techniques for installing unwanted and damaging software onto computers connected to the Internet. Malicious software such as spyware or keyloggers can capture private details of a persons life such as bank account numbers, social security numbers, or credit card numbers which can be used in identify theft. Also, malicious software can convert a computer into a remotely controllable "zombie" computer that can be used in denial of service (DOS) attacks or other criminal activity. There are many ways that malicious software can be downloaded from the Internet. Typically, the malicious software is unintentionally loaded by a user navigating to a website and downloading seemingly harmless or useful software. Sometimes the malicious software is disguised as a useful file or media (e.g. music, videos). Also, the software can be obtained from an e-mail message.

The problem of malicious software is growing, and threatens many legitimate commercial activities on the Internet. Also, malicious software can cause profound damage to computer networks and inconvenience to Internet users.

It would be an advance in the art to provide a simple and effective method for preventing the installation and operation of malicious software. Such a method should provide full-function and convenient access to the Internet without allowing installation of malicious software.

SUMMARY OF THE INVENTION

The present invention provides a method for secure Internet access. In the present method, first and second partitions are created in a computer memory (e.g. random access memory). Each partition has its own operating system (OS). The first partition is for conventional computer use, and has a conventional operating system. The second partition is for secure Internet use according to the present invention, and has an Internet OS specific for Internet use according to the present invention. The Internet OS cannot write or copy files in the second partition, or change the size of the second partition. Operation of the computer from the second partition may be invoked by any shortcut technique such as an executable file launched by selection of a screen icon.

To access the Internet in a secure manner, Internet software is loaded into the second partition, and then the Internet is accessed using software in the second partition. According to the present invention, the second partition provides secure access to the Internet. Malicious software loaded into the second partition from the Internet will be unable to create or change files in the second partition, and will be unable to change the size of the second partition or memory allocated for Internet software applications.

Preferably in the present invention, a secure memory is also provided. The secure memory temporarily stores software applications and files used in the second partition. Also, the secure memory can have a cyclic redundancy check (CRC) table or similar repository for data which can be used to detect changes in a file. (A cyclic redundancy check is a technique for calculating a number from particular text in a potentially much larger file and even a minor change in the text may result in a significantly different number. Hereinafter, the term cyclic redundancy check or CRC will be used as a collective reference to all techniques and arrangements such as hashing functions and the like capable of determining changes in files.) The CRC table stores CRC values for all files in the secure memory. When software is loaded from the secure memory into the second partition, CRC values are calculated for all files in the second partition, and the calculated CRC values are compared to CRC values stored in the CRC table. If the CRC values match, then Internet access can proceed. If they do not match, then malicious software may be present. Access to the Internet is stopped and new software may be loaded into the second partition (e.g. from the secure memory, a hard drive or other secure source).

Also, a download memory is preferably provided. The download memory temporarily stores files downloaded from the Internet. Before downloaded files are transferred to the first partition, the files are scanned for malicious software using any suitable technique, such as anti-virus software or detection of unlikely commands. The download memory provides a secure storage for potentially infected files until they can be scanned and tested for malicious software.

In the present invention, the Internet OS can only write or copy files in the secure memory or in the download memory but cannot write within the second partition. Also, software applications in the second partition preferably have allocated memory regions with fixed, unchangeable size(s). This prevents malicious software from gaining access to the computer by causing program memory overflow. It is noted that "fixed and unchangeable" means that the allocated memory cannot be changed after the second partition has been created. Second partition size and memory allocated can be changed if the second partition is closed, and a new second partition is created with different memory allocation sizes.

DETAILED DESCRIPTION OF THE INVENTION

The present invention provides a method and apparatus for preventing the installation of malicious software on an Internet-connected computer. In the present invention, the computer has a random access memory that is divided into two partitions. A first partition is for normal, preferably non-Internet related use. A second partition is for secure Internet use. The second partition has its own operating system, Internet browser and other software suitable for internet communications and, preferably, only such software. The operating system in the second partition is thus restricted in functionality. Specifically, the operating system within the second partition cannot expand the size of the second partition memory, and cannot write or copy files to the second partition (or the first partition) but only to a download memory or a secure memory (under password or similar protection). A secure memory (e.g. password secured for at least write operations thereto) is also provided. The secure memory is read accessible by software in both partitions. The secure memory contains software (e.g. Internet browser and cyclic redundancy check software) and files that are used for building the second partition. Every time Internet access is desired (or during computer startup or periodically after the second partition is built), software and files in the secure memory are authenticated (e.g. by cyclic redundancy check (CRC)), and then loaded into the second partition, if needed. Also, a method is provided for downloading files into a download memory before loading and installation in the first partition. By doing so, malicious software loaded into the second partition from the Internet cannot copy or write files within the second partition, cannot propagate to the first partition, and is therefore limited in its ability to create damage. Accordingly, the present invention provides full-function Internet access, protection from malicious software, and protection from downloading undesired software or files generally.

In the present invention, the partitions are defined as regions of computer memory or groups of memory addresses in a computer readable memory. Typically, the partitions will be located in high-speed random access memory available to a microprocessor for performing operations which will be described in detail below in accordance with computer-readable instructions stored in the memory. Each partition can essentially function as a separate computer, though processing for both partitions is preferably performed by a single processor. Software and files can be moved between partitions and memory areas according to the secure methods described herein.

Figure 1:
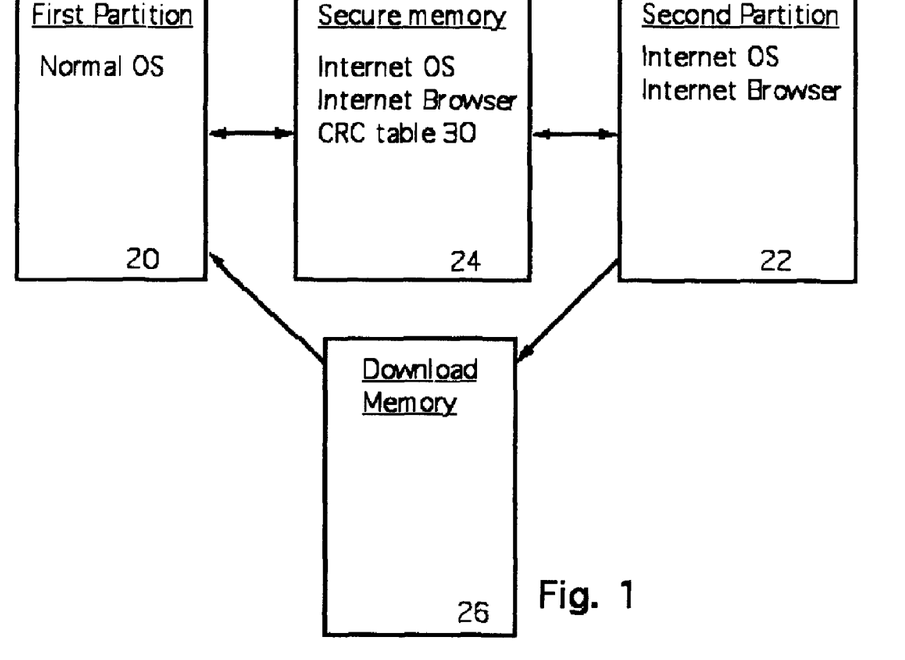
FIG. 1 shows a memory allocation structure inside a computer according to the present invention.

FIG. 1 illustrates a memory structure of a computer according to the present invention. In a computer operating according to the present invention, a first memory partition 20 and second memory partition 22 are provided. The partitions 20, 22 are stand-alone regions of random access memory. Each partition 20, 22 contains its own operating system (OS). The present computer includes a secure memory 24, which may be password-protected. The operating systems in both partitions 20, 22 can read and write to the secure memory 24. Also provided is a download memory 26 for temporarily storing potentially infected files downloaded from the Internet. Generally, the second partition 22 can write to the download memory 26, and the first partition 20 can read from the download memory 26 in order to perform scanning for malicious software and subsequent storage or other operations if no malicious software was found.

The first partition 20 is a region of memory dedicated to software (e.g. computer-readable instructions) required for normal operation of the computer such as the operating system and other desired software. According to the present invention, the first partition preferably does not contain software (e.g. a browser) that accesses the Internet, if the computer is to be limited to secure internet access, as is considered to be desirable. That is, in the present invention, the first partition 20 is preferably never directly connected to the Internet. Hence, the first partition is generally not directly vulnerable to malicious software from the Internet. Preferably in the present invention, only the second partition 22 contains software that can access the Internet. The first partition 20 can, however, receive files downloaded from the Internet after they have passed through the download memory 26 where they may be scanned for the presence of malicious software.

The second partition 22 contains software required for accessing the Internet such as an Internet browser, or e-mail application (optional). Also, the second partition 22 may include software specific to carrying out the invention as set forth below. The operating system in the second partition 22 preferably is simple and preferably lacks features that are not necessary for using the Internet and which could be used or exploited by malicious software. For example, the operating system in the second partition 22 may lack instructions for printing, or operating software applications unrelated to Internet access or functionality. Also, the second partition 22 and/or the Internet OS is programmed such that file copy and file write commands are not permitted for copying or writing to the second partition. The Internet OS in the second partition 22 cannot write files to the second partition, and cannot copy files in the second partition. The Internet OS can only write and copy files to the secure memory 24 (on a password protected basis or under other security arrangements) and the download memory 26. This is a fundamental and essential aspect of the present invention since it limits propagation of any malicious software to the first partition. This feature is also protected from being defeated by other features of the invention that will be discussed more fully below.

The download memory 26 temporarily stores files downloaded from the Internet by software (e.g. a browser) contained in the second partition 22. The download memory 26 functions as a temporary storage area for downloaded file that may be malicious. Before being transferred to the first partition 20, downloaded files are scanned and checked for malicious software or files or other undesirable data.

The secure memory 24 is a region of random access memory or hard drive memory that stores software applications used by the second partition 22. For example, the secure memory can contain an Internet operating system (OS) and Internet browser. Files can be copied from and written to the secure memory 24 by both the first partition 20 and the second partition 22. The secure memory 24 is preferably password-protected. For example, a password may be required each time a file is written to or copied from the secure memory 24, although a password may not be required for reading some files used for operation of the invention such as the CRC table or other arrangements used to detect changes in files.

Figure 2:
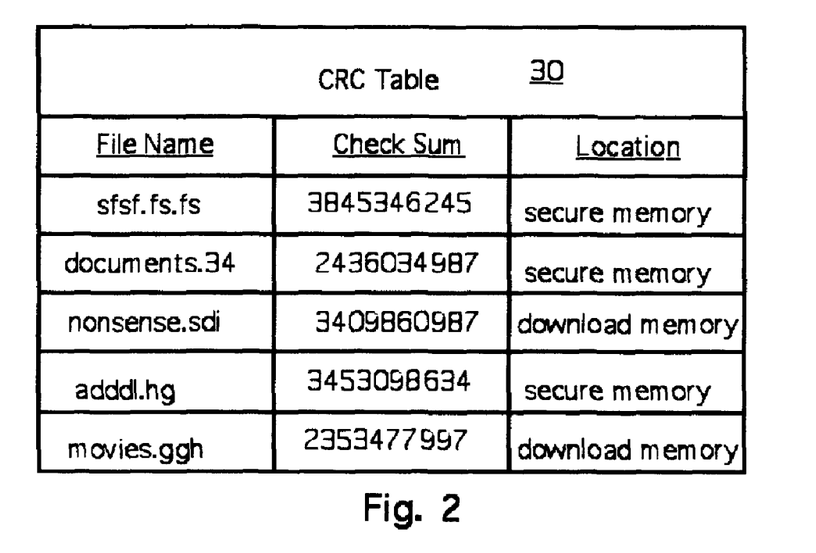
FIG. 2 shows a cyclic redundancy check table according to the present invention. The CRC table preferably stores CRC values for all files loaded into or created within the second partition.

The secure memory 24 also preferably contains a cyclic redundancy check (CRC) table. FIG. 2 illustrates an exemplary CRC table 30. The CRC table stores cyclic redundancy checksum values for files that are stored in the secure memory. CRC checksum values are calculated using well known CRC calculation techniques. CRC calculations are akin to hash function or digital signatures. CRC values change when the underlying file used to create the CRC value is changed.

Files that can have CRC values in the CRC table include files that can be created or altered by an e-mail program or browser in the second partition 22, the Internet browser and associated files, and, optionally, the Internet OS. For example, if a browser creates a preferences file, or a bookmarks file, then these files should have checksum values stored in the CRC table. The CRC table is used to determine if changes have been made to files used in the second partition. Changes made to files will result in altered CRC values; altered CRC values can be detected by comparison to the CRC table. Altered CRC values will thus indicate the potential presence of malicious or unauthorized software in the second partition.

Also, it is noted that the CRC table may include CRC values for files stored in the download memory. For example, a CRC value may be obtained from an independent and/or external source to authenticate software which may be downloaded over the Internet such as periodic updates for applications or even anti-virus software and the like.

FIG. 1 illustrates memory allocation in a computer device that is ready to access the Internet. Specifically, the second partition 22 is established, and the Internet OS and browser are contained within the second partition 22. In the present invention, the computer proceeds through an initialization procedure at startup or when secure Internet access is desired.

Figure 3A:
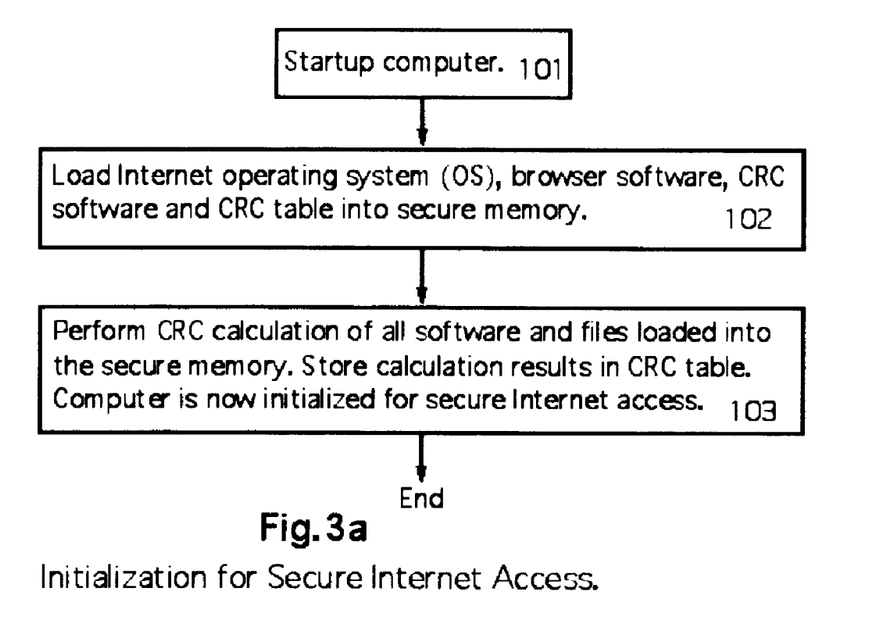
FIGS. 3a and 3b show flow charts for initialization methods for preparing the computer for implementing the method of secure Internet access according to the present invention.
Figure 3B:
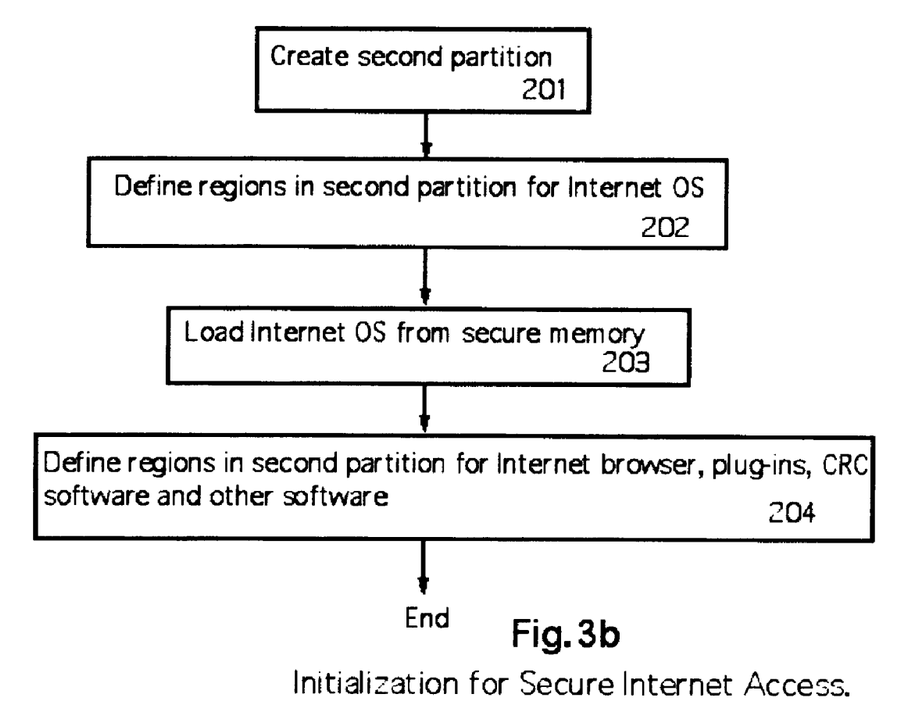

FIGS. 3a and 3b show flow charts for initializing a computer for implementing the present invention. The steps of FIGS. 3a and 3b can be performed together (e.g. in a concurrent or interleaved fashion) or separately. FIG. 3a illustrates the initialization procedure for creating the memory structure illustrated in FIG. 1. The initialization process of FIG. 3a proceeds as follows:

Step 101: Computer is started.

Step 102: Internet OS, browser software (and other software needed for Internet access), CRC software, and CRC table 30 are loaded into the secure memory 24 (e.g. from a hard drive). The operating system in the first partition can manage the loading of software into the secure memory 24. The CRC software include instructions for calculating CRC values, and comparing calculated CRC values with CRC values stored in the CRC table 30.

step 103: CRC values are calculated for all files in the secure memory, and the results are stored or updated in the CRC table 30. The CRC value calculations can be performed in the first partition 20 or in the second partition 22. However, the second partition 22 might not be established during the initialization process of FIG. 3a.

In the initialization process of FIG. 3b, the second partition is established. Regions within the second partition 22 are established. The initialization process of FIG. 3b proceeds as follows:

Step 201: The second partition is created. The second partition is an area in random access memory. Once created, the second partition size (i.e. amount of allocated memory) cannot be changed. However, the size of the second partition can be changed by closing the second partition, and then recreating a new second partition with a different size.

Step 202: A region is defined within the second partition for the Internet operating system (OS). A region is a defined area of memory allocated for a specific purpose or software application. Once created, the region for the Internet OS cannot be changed.

Step 203: The Internet OS is loaded from the secure memory. This step should be performed after a CRC value has been calculated for the Internet OS in order to support authentication of the first partition to the second partition. It is preferable, in this regard, to allow opening of the second partition only from the computer operating from the first partition.

The loading of the Internet OS may be considered as a "permanent write" to the second partition. That is, when written in the second partition it is intended to remain in second partition storage at least while the second partition session is open unless a change therein is detected; upon the occurrence of which, the Internet OS is erased and rebuilt from secure memory 24 while again checking and authenticating the files copied to the second partition. Such "permanent writing" is to be distinguished from temporary writing which is used, for example, for building an Internet transaction and erased after the transaction is transmitted and which must be allowed in the second partition for that reason.

Step 204: Regions in the second partition 22 are defined for other software applications. Each application will have its own memory region in the second partition. Once created, the regions cannot be changed (e.g. changed in size). The amount of memory allocated for a software application in the second partition cannot be changed without closing the second partition and recreating a new second partition. In other words, in order to change the size of the second partition or regions within the second partition, the initialization process of FIGS. 3a and 3b must be repeated.

For each boot-up of the second partition 22, the memory allocation structure within the second partition is fixed and unalterable. If a software application operating within the second partition 22 requires memory exceeding the size of its allocated region, then the software application will crash, and preferably quit. This feature of the present invention prevents common techniques exploited by malicious software to gain unauthorized access to computer systems. Specifically, malicious software often increases or alters memory allocation (i.e. program memory overflow) so that it can install itself into the computer system. The fixed memory allocation scheme in the second partition 22 effectively prevents such methods even if the inability of the internet OS to write to the second partition is defeated or circumvented. Further, if any attack on the internet OS in accordance with the invention succeeds in defeating or circumventing either of these protection mechanisms, that attack can be detected by periodic CRCs while the second partition is open. After the initialization processes of FIGS. 3a and 3b have been performed, the memory structure of the computer will be as illustrated in FIG. 1.

Figure 4:
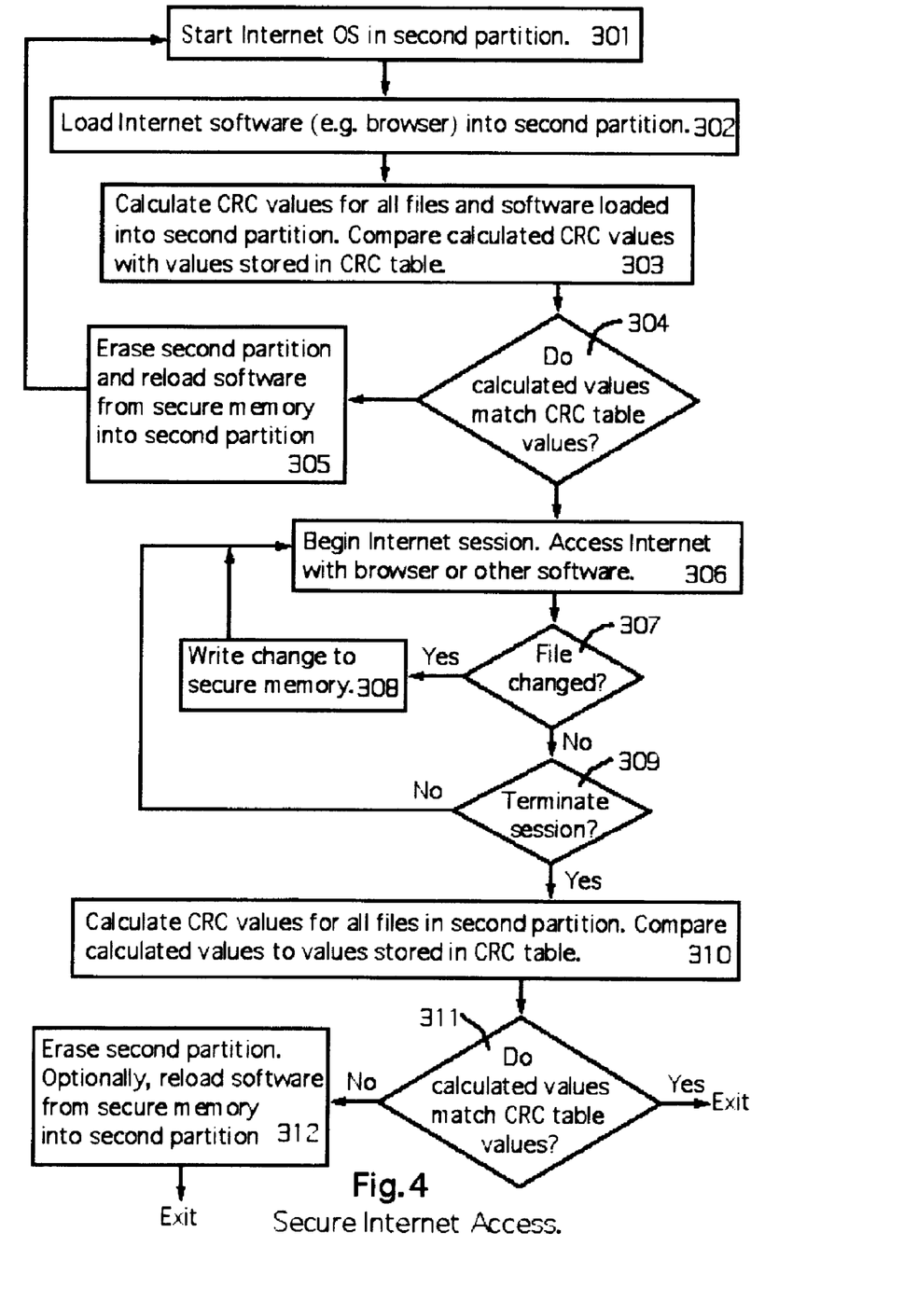
FIG. 4 shows a flow chart for secure Internet access according to the present invention.

FIG. 4 shows a flow chart illustrating the method of secure Internet access according to the present invention. FIG. 4 illustrates how to access the Internet, surf the Internet, and close an Internet connection in secure manner. FIG. 4 does not illustrate how to securely download files, which is the subject of FIG. 5, explained below. The steps of FIG. 4 are explained as follows:

Step 301: The Internet OS is started in the second partition. The Internet OS is preferably a simplified operating system designed specifically for accessing the Internet. The Internet OS cannot write or copy files in the second partition and may lack the capability of writing or copying files altogether (although "temporary writing", as defined above must be permitted). The inability to write or copy files in the second partition or to propagate files to the first partition without either a password or the like to write to the secure memory 24 or scanning of such files while stored in the download memory; both memories being separated from the first partition, reduces the risk from malicious software, which can otherwise hijack the write and copy capabilities of an operating system.

Step 302: Other software is loaded into the second partition. Each software application is loaded into its assigned and fixed region. CRC value calculation and comparison software is loaded into the second partition.

Step 303: CRC values are calculated for all files and software applications (preferably including the Internet OS) loaded in the second partition.

Step 304/305: The CRC software periodically compares calculated CRC values with CRC values stored in the CRC table (located in the secure memory). This comparison can be executed very quickly and does not present a significant processing overhead burden, even if performed relatively often or even at each instance of receiving data from the Internet. If the calculated and stored CRC values do not match, then files in the second partition may be contaminated with malicious software. For example, the malicious software may have changed a file loaded in the second partition. Hence, if the calculated and stored CRC values do not match, then files in the second partition are erased, and the software is reloaded into the second partition from secure memory 24 or other secure source. Also, the initialization procedures of FIGS. 3a and 3b can be repeated in case the values do not match. Also, files stored in the download memory can be checked by CRC calculation and comparison with a CRC value derived from an external and/or independent source, as alluded to above, in order to authenticate a downloaded file before it can be propagated into the first partition or secure memory. In this regard, the processor can use the OS of the first partition to scan and inspect a file in the download memory 26 without actually importing or opening that file.

Step 306: If the CRC values match, an Internet session in started. The Internet can be accessed by a browser or any other Internet related software.

Step 307/308: During the Internet session, files in the second partition are monitored periodically for changes. For example, changes may include changes made to a browser preferences file, or a bookmarks file. If a file is changed, then the change is written to a corresponding file in the secure memory 24. The changes written to the secure memory will result in new CRC values in the CRC table in the next initialization procedure of FIG. 3a.

Step 309: If the Internet session is to be terminated, then a termination procedure (beginning with step 310) is initiated.

Steps 310/311: CRC values are calculated for all files in the second partition, and then compared to the CRC values in the CRC table 30. Steps 310 and 311 are performed to determine if any files in the second partition have been changed. A changed file can indicate the presence of malicious software.

Step 312: If changed CRC values are detected, then the second partition is erased. Optionally, software can be reloaded from the secure memory. Also optionally, if the CRC values are changed, then changes made to the secure memory in step 308 can be erased.

Figure 5:
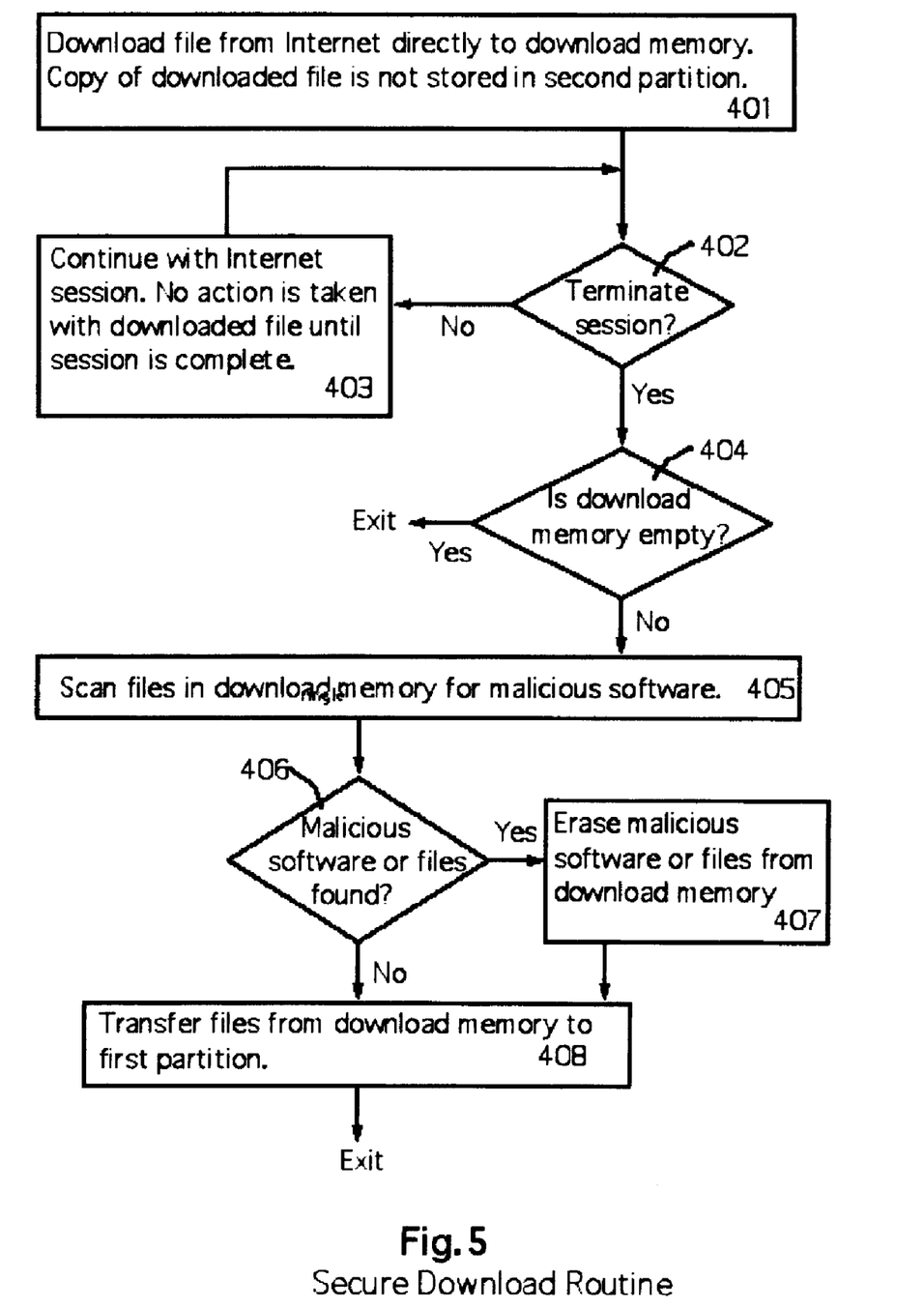
FIG. 5 shows a flow chart for secure downloading of files from the Internet according to the present invention.

In the present invention, files can be securely downloaded from the Internet and scanned for malicious software. Downloaded files are not able to infect the computer before being scanned since they are stored in the separate download memory 26 and not in the first partition while the scanning is carried out. In the present invention, downloaded files are loaded directly into the download memory from the second partition. Before being loaded into the first partition, downloaded files are scanned for malicious software. Preferably, the download memory has a fixed size. The flow chart of FIG. 5 illustrates the method of the present invention for securely downloading files from the Internet. The steps of FIG. 5 proceed as follows:

Step 401: Files are downloaded directly into the download memory. The download file is not copied or stored in the second partition, because the Internet OS is unable to write or copy files in the second partition. However, the Internet OS is able to write files in the download memory 26.

Step 402: If Internet session is to be terminated, then download procedure is initiated (beginning with step 403).

Step 403: No action is taken with downloaded files in the download memory until Internet session is terminated.

Step 404: If no files have been downloaded, and download memory is empty, then no action is necessary and the session may exit.

Step 405: If the download memory contains files, then these files are scanned for malicious software such as spyware, keyloggers, viruses and the like.

Step 406/407: If malicious software is discovered, then the malicious software is erased from the download memory. Optionally, the entire download memory can be erased.

Step 408: After the download memory has been scanned, and cleaned of malicious software, then files stored in the download memory are loaded into the first partition.

It is important to note that the steps illustrated in FIGS. 4 and 5 will typically be combined. For clarity and brevity, the methods of FIGS. 4 and 5 have been illustrated in separate flow charts. For example, steps 309 and 402 are essentially the same. Termination of an Internet session will proceed to both steps 310 and 404. Steps 310 and 404 can be performed simultaneously.

Also, it is noted that Internet related software such as Internet browsers and the like can be operated in the first partition. The first partition can support any conventional computer applications, including conventional Internet access. The second partition provides secure Internet access. If Internet access does not need to be secure, then the first partition can be used to access the Internet in the conventional manner without use of the invention. However, in view of the foregoing, it is seen that the invention provides features which include multiple layers of protection from malicious software that can be transmitted over the Internet, each of which features provides substantial protection while cooperating together in a manner which prevents respective features from being individually defeated or circumvented. Specifically, 1.) the writing or copying of files in the second partition is not permitted so that executable files cannot be installed in the second partition; 2.) once the second partition is built by transfer of authenticated Internet OS files from the secure memory, the storage space for the respective files and the size of the second partition are fixed and unchangeable, which on the one hand, prevents installation of modified software and on the other hand causes any software of a size exceeding the authenticated software to malfunction and cease execution; 3.) any changes in any files of the Internet OS are detected by initial and final (e.g. when the second partition is closed and/or the Internet session terminated) CRC checks and periodic CRC checks while the second partition is open and which results in erasure and rebuilding of the second partition if any possible modification of any file is detected; 4.) at least write operation password protection of the secure memory and no need or provision outside of password control for writing from the second partition to the secure memory; and 5.) temporary storage in a download memory prior to permitting storage in the first partition so that any downloaded files can be scanned for malicious software prior to storage in the first partition or any other operation performed.

It will be clear to one skilled in the art that the above embodiment may be altered in many ways without departing from the scope of the invention. Accordingly, the scope of the invention should be determined by the following claims and their legal equivalents.

What is claimed is:

1. A method for secure Internet access, comprising the steps of:
 a) creating a first partition and a second partition in a computer memory,
 wherein the first partition contains a conventional operating system for conventional use,
 wherein the second partition contains an Internet operating system (OS) specific for Internet related use, the Internet OS being loaded to the second partition from a secure memory that is read and write accessible by both the first partition and the second partition;

wherein the Internet OS does not allow file writing or file copying within the second partition, and does not allow changing the size of the second partition;

b) loading Internet-related application software into the second partition;

c) accessing the Internet with the Internet-related application software in the second partition, software downloaded from the Internet thereby being unable to write or copy files in the second partition or propagate to the first partition.

2. The method according to claim 1, wherein the Internet-related application software is loaded from the secure memory to the second partition in step (b).

3. The method according to claim 2, wherein the secure memory further contains a cyclic redundancy check (CRC) table.

4. The method according to claim 3, further comprising the step of calculating CRC values of a plurality of files loaded into the second partition in step (b), and, before step (c), comparing calculated CRC values to CRC values stored in the CRC table.

5. The method according to claim 1, further comprising the step of creating a download memory for temporarily storing files downloaded from the Internet.

6. The method according to claim 5, further comprising the step of scanning files in the download memory for malicious software.

7. The method according to claim 1, wherein each software application stored in the second partition is allocated a memory region of fixed, unchangeable size.

8. A computer for providing secure access to the Internet, comprising:
   a) a processor,
   b) a computer readable memory in communication with the processor, wherein the memory comprises:
      1) a first partition and a second partition;
         wherein the first partition contains a conventional operating system for conventional use,
         wherein the second partition contains an Internet operating system (OS) specific for Internet related use;
         wherein the Internet OS does not allow file writing or file copying within the second partition and does not allow changing the size of the second partition;
      2) a secure memory accessible to both the first partition and the second partition, wherein the secure memory contains a cyclic redundancy check (CRC) table;
      3) computer-readable instructions for loading Internet-related application software from the secure memory into the second partition;
      4) computer-readable instructions for calculating CRC values of a plurality of files in the second partition;
      5) computer-readable instructions for comparing calculated CRC values with CRC values stored in the CRC table to provide CRC results;
      6) computer-readable instructions for accessing the Internet with the Internet-related application software in the second partition, software downloaded from the Internet thereby being unable to write or copy files in the second partition or propagate to the first partition.

9. The computer for providing secure access to the Internet according to claim 8, further comprising computer readable instructions for initiating operation of said computer using said second partition including said Internet OS.

10. The computer for providing secure access to the Internet according to claim 9, wherein said computer readable instructions for initiating operation of said computer using said second partition including said Internet OS are initiated by selection of an icon.

11. The computer for providing secure access to the internet according to claim 8, wherein said computer-readable instructions for comparing calculated CRC values with CRC values stored in the CRC table to provide CRC results are executed periodically and said computer-readable instructions for loading Internet-related application software from the secure memory into the second partition include computer-readable instructions for erasing files from said second partition prior to loading Internet-related application software and are executed in response to said CRC results.

12. The computer for providing secure access to the Internet according to claim 8, wherein the memory further comprises a download memory for temporarily storing files downloaded from the Internet.

13. The computer for providing secure access to the Internet according to claim 9, further comprising computer readable instructions for scanning files in the download memory for malicious software.

14. A method for secure Internet access, comprising the steps of:
   a) creating a first partition and a second partition in a computer memory;
      wherein the first partition contains a conventional operating system for conventional use,
      wherein the second partition contains an Internet operating system (OS) specific for Internet related use,
      wherein the Internet OS does not allow file writing or file copying within the second partition and does not allow changing the size of the second partition;
   b) creating a secure memory read and write accessible to both the first partition and the second partition,
   c) loading Internet-related application software from the secure memory into the second partition; and
   d) accessing the Internet with the Internet-related application software in the second partition, software downloaded from the Internet thereby being unable to write or copy files in the second partition or propagate to the first partition.

15. The method according to claim 14, wherein the secure memory contains a cyclic redundancy check (CRC) table, and the method further comprises the steps of:
   1) calculating CRC values for a plurality of files in the second partition; and
   2) before step (f), comparing calculated CRC values with CRC values stored in the CRC table.

16. The method according to claim 14, further comprising the step of creating a download memory for temporarily storing files downloaded from the Internet.

17. The method according to claim 16, further comprising the step of scanning files in the download memory for malicious software.

18. The method according to claim 14, wherein each software application in the second partition is allocated a memory region of fixed, unchangeable size.

* * * * *